(12) United States Patent
Tsai

(10) Patent No.: US 7,542,917 B2
(45) Date of Patent: Jun. 2, 2009

(54) SYSTEM AND METHOD FOR ANALYZING SALES PERFORMANCES

(75) Inventor: Ming-Fang Tsai, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1234 days.

(21) Appl. No.: 10/648,745

(22) Filed: Aug. 25, 2003

(65) Prior Publication Data

US 2004/0128185 A1 Jul. 1, 2004

(30) Foreign Application Priority Data

Dec. 27, 2002 (TW) ............................. 91137604 A

(51) Int. Cl.
*G06F 17/30* (2006.01)
(52) U.S. Cl. ...................................... 705/10
(58) Field of Classification Search ............. 705/10–11
See application file for complete search history.

(56) References Cited

U.S. PATENT DOCUMENTS

| | | | | |
|---|---|---|---|---|
| 5,966,695 | A * | 10/1999 | Melchione et al. | 705/10 |
| 6,609,101 | B1 * | 8/2003 | Landvater | 705/10 |
| 6,839,681 | B1 * | 1/2005 | Hotz | 705/10 |
| 6,850,896 | B1 * | 2/2005 | Kelman et al. | 705/10 |
| 7,305,352 | B2 * | 12/2007 | Ikezawa et al. | 705/10 |
| 7,424,440 | B1 * | 9/2008 | Gupta et al. | 705/10 |
| 2002/0178035 | A1 * | 11/2002 | Lajouanie | 705/7 |

FOREIGN PATENT DOCUMENTS

WO WO 00/57976 * 10/2000

OTHER PUBLICATIONS

Wade (Sales performance measurement in bank branches), Dec. 2001, Science Direct, pp. 1-13.*
Stanley et al (Strategy Type and Performance: The Influence of Sales Force Management), Mar. 2000, Strategic Management Journal, pp. 813-829.*
Heinz-Dieter Haustin (Upgrading Through Innovation: An Economic Challenge (Innovativeness and Kilo-Prices of Export Commodities), Jul. 1982, International Institute For Applied Systems Analysis), pp. 1-44.*

(Continued)

*Primary Examiner*—Romain Jeanty
(74) *Attorney, Agent, or Firm*—Wei Te Chung

(57) ABSTRACT

A system for analyzing sales performances includes a performance calculating module (201), a performance analyzing module (202), a performance querying module (203) and a document updating module (205). The performance calculating module is used to calculate daily, monthly, and yearly sales performances in accordance with sales records. The performance analyzing module is used to analyze sales performances. The performance querying module is used to query data on sales performances. The document updating module is used to update data stored in a database server (121). A related method includes: (a) calculating daily sales performances in accordance with sales records; (b) calculating monthly and yearly sales performances; (c) querying statistical performance records in accordance with an instruction input by a user; and (d) analyzing sales performances in accordance with data stored in daily performance records, statistical performance records, and planning performance records.

8 Claims, 4 Drawing Sheets

OTHER PUBLICATIONS

Stanley et al "Strategy Type and Performance: The Influence of Sales Force Management", Dec. 2000, Strategic Management Journal, pp. 813-829.*

Slater (Strategy type and performance: The Influence of Sales Force Management), Dec. 2000, Strategic Management Journal, pp. 813-829).*

Batt (Work Organiation, Technology, and Performance in Customer Service and Sales) Jul. 1999, Industrial and Labor Relations Review, vol. 52 No. 4, pp. 1-27.*

Grant et al (Examining Sales Force Performance in Organizations That Use Behavior-Based Sales Management Processes), Dec. 1996, Industrial Marketing Management 25, pp. 361-371.*

* cited by examiner

SYSTEM AND METHOD FOR ANALYZING SALES PERFORMANCES

BACKGROUND OF THE INVENTION

1. Field of the Invention

The present invention relates to a computer data processing system that is part of a management information system, and especially to a system and method for managing sales performances via distributed computers.

2. Background of the Invention

Globalized economic development has brought tremendous business opportunities to numerous enterprises, and has also brought more pressure to bear on these enterprises. To maintain keen competitiveness, an enterprise needs to improve its internal management, and to strengthen control in every step of its supply chains in order to efficiently allocate and use resources.

Computerized Sales Force Automation (SFA) systems and Customer Relationship Management (CRM) systems can assist in advancing an enterprise's sales competitiveness. These systems can reduce sales cycles, improve sales efficiency, and reduce sales overheads. For example, P. R. China patent application No. 1325082A entitled "Method for Managing Data on Products" discloses an information system for managing data on sales products. In this system, a plurality of distributed mobile terminals is used to read bar codes of products, and input data on products into a computer for processing. The system can enhance the efficiency of inputting product data, and avoid human error associated with manual data inputting.

However, the above-described information system can only obtain product data and perform simple statistical tasks. The system cannot thoroughly analyze sales information.

SUMMARY OF THE INVENTION

Accordingly, an objective of the present invention is to provide a system for analyzing sales performances which can assist in managing sales forces for enterprises.

Another objective of the present invention is to provide a method for analyzing sales performances which can assist in managing sales forces for enterprises.

In order to achieve the first above-mentioned objective, a system for analyzing sales performances in accordance with the present invention comprises a performance calculating module, a performance analyzing module, a performance querying module and a document updating module. The performance calculating module is used to calculate daily, monthly, and yearly sales performances in accordance with sales records. The performance analyzing module is used to analyze sales performances in accordance with daily performance records, statistical performance records and planning performance records. The performance querying module is used to query data on sales performances stored in the daily performance records, the statistical performance records and the planning performance records. The document updating module is used to update data stored in the daily performance records and the statistical performance records.

In order to achieve the second above-mentioned objective, a method for analyzing sales performances in accordance with the present invention comprises the steps of: (a) calculating daily sales performances in accordance with sales records, and storing the sales performances in daily performance records; (b) calculating monthly and yearly sales performances in accordance with data stored in the daily performance records, and storing the sales performances in statistical performance records; (c) querying the statistical performance records in accordance with an analysis instruction input by a user; and (d) analyzing sales performances in accordance with data stored in the daily performance records, the statistical performance records, and the planning performance records.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Reference will now be made to the drawings to describe the present invention in detail.

Figure 1:
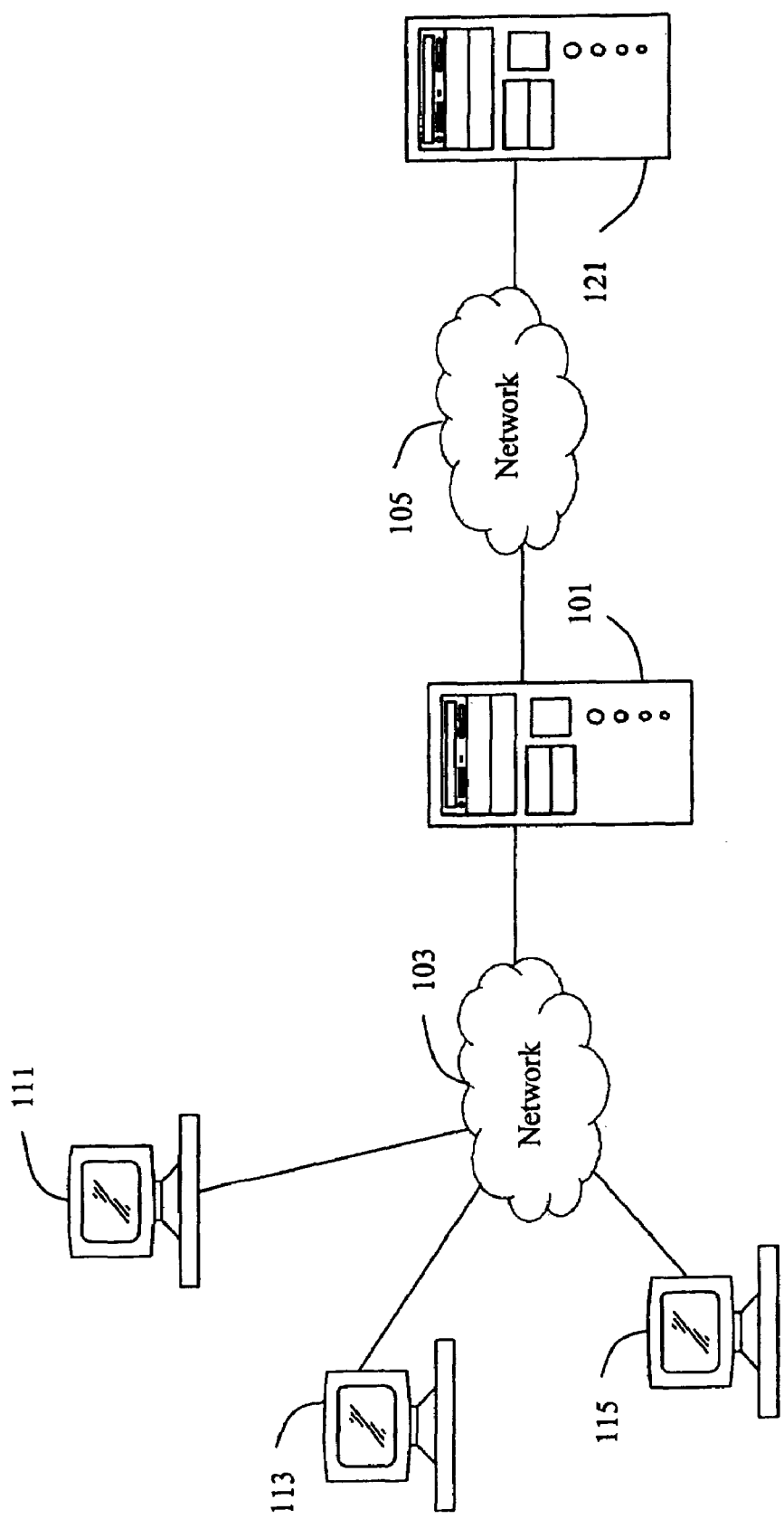
FIG. 1 is a schematic diagram of hardware configuration of a system for analyzing sales performances in accordance with a preferred embodiment of the present invention, the system comprising a plurality of client computers, an application server, and a database server.

FIG. 1 is a schematic diagram of hardware configuration of a system for analyzing sales performances in accordance with the preferred embodiment of the present invention. The system for analyzing sales performances comprises a three-layer information system. The three-layer information system comprises a data access layer, a business logic layer, and a presentation layer. The data access layer comprises a database server 121. The business logic layer comprises an application server 101. The presentation layer comprises a plurality of client computers. For the purposes of conveniently illustrating the preferred embodiment of the present invention, three client computers 111, 113, 115 are shown and described hereinafter. Computer communication networks 103, 105 interconnect all the above-mentioned apparatuses.

The application server 101 comprises core and mutable enterprise logic (such as rules, execution, and management) of the system for analyzing sales performances. The application server 101 processes input of users, and returns results of processing to users. The database server 121 has a database located therein, which stores all structured data on an enterprise. The database server 121 is used for managing processing of the stored data. Such processing includes reading, writing, deleting, modifying, and backup. The client computers 111, 113, 115 have the function of receiving orders input by users, and displaying results of implementation of such orders. The client computers 111, 113, 115 can be simple input/output devices known in the art.

Figure 2:
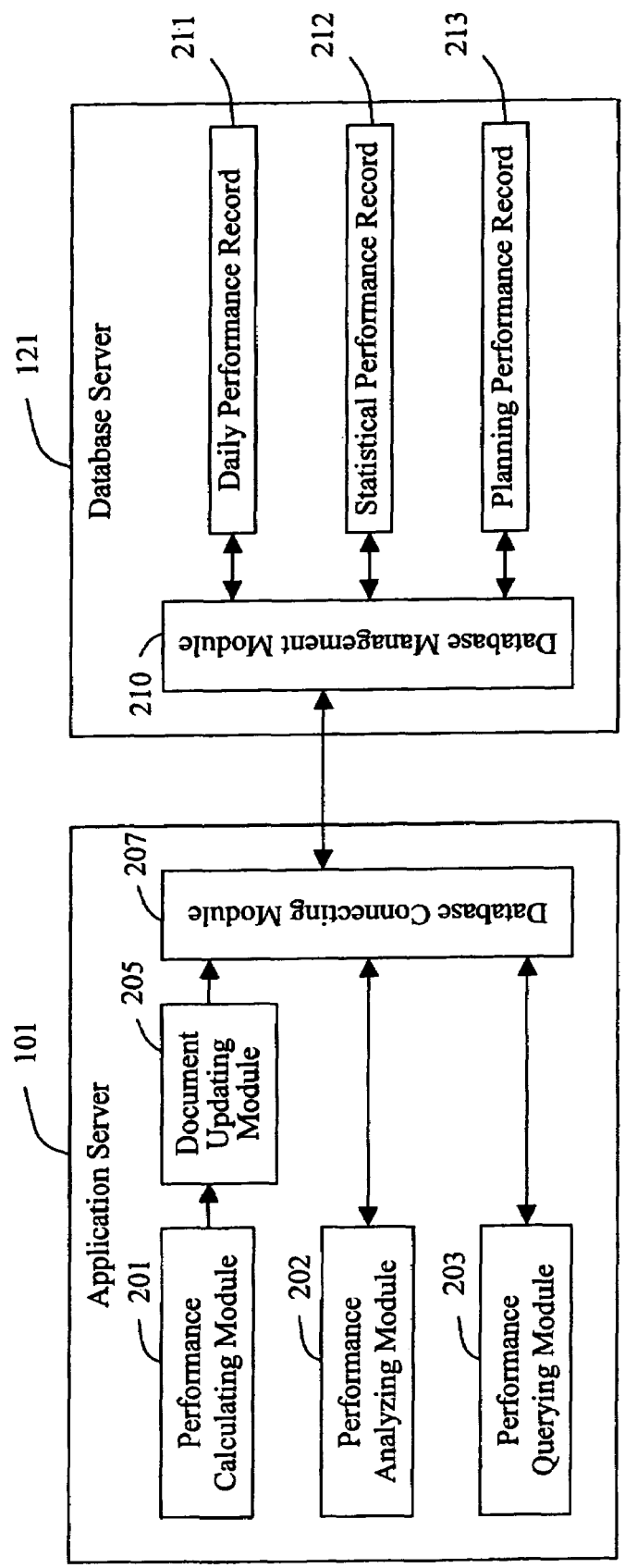
FIG. 2 is a block diagram of function modules of the application server and the database server of the system of FIG. 1, and of communication between the application server and the database server.

FIG. 2 is a block diagram of function modules of the application server 101 and the database server 121, and of communication between the application server 101 and the database server 121. The application server 101 includes a performance calculating module 201, a performance analyzing module 202, a performance querying module 203, a document updating module 205, and a database connecting module 207. The database server 121 includes a database managing module 210, a plurality of daily performance records 211 (only one shown), a plurality of statistical performance records 212 (only one shown), and a plurality of planning performance records 213 (only one shown).

Each daily performance record 211 is used to store daily sales performances, and comprises data on customers, channels of distribution, sales representatives, sales departments, distribution areas, product codes, product quantities and total values of products. Each statistical performance record 212 is calculated from a plurality of daily sales performance records. The statistical performance records 212 comprise monthly statistical performance records and yearly statistical performance records. Each statistical performance record 212 comprises data on customers, channels of distribution, sales representatives, sales departments, distribution areas, product codes, product quantities, total values of products, and periods of time the subject of the statistical performance. Each planning performance record 213 is used to store data on planned sales performances, and comprises data on sales departments, product codes, and planned product quantities.

The performance calculating module 201 is used to calculate daily sales performances in accordance with sales data stored in the daily performance records 211. The sales data comprise sales return records and records on reselling of sales returns. The sales return records are reductions in sales performances, and the records on reselling of sales returns are increases in sales performances. The results of the calculation are stored in the daily performance record 211. The performance calculating module 201 is also used to calculate monthly and yearly sales performances in accordance with data on daily sales performances, and to store results of the calculations to the monthly statistical performance records and yearly statistical performance records of the statistical performance records 212. The performance analyzing module 202 is used to analyze sales performances relating to customers, products, sales departments, sales representatives and channels of distribution in accordance with data stored in the daily performance records 211, the statistical performance records 212 and the planning performance records 213. The performance analyzing module 202 can assist in obtaining implementation statuses of planned sales performances relating to customers, products, sales departments, sales representatives and channels of distribution. Users can thereby easily determine bottlenecks of sales. The performance querying module 203 is used to query data on sales performances stored in the daily performance records 211, the statistical performance records 212, and the planning performance records 213. The queried data comprise sales data on customers, channels of distribution, sales representatives, sales departments, distribution areas, product codes, product quantities and total values of products. The document updating module 205 is used to update data stored in the database server 121 in accordance with results of implementation of information by the performance calculating module 201. Such updating is performed via the database connecting module 207 and the database managing module 210.

The database connecting module 207 is used for connecting the application server 101 with the database server 121. The database connecting module 207 controls data communication between applications and source data. Applications of the application server 101 can access data stored in different database management systems (DBMSs) via the database connecting module 207. The database connecting module 207 can be founded on open database connectivity (ODBC). The database managing module 210 is used to manage data stored in the database server 121, including data stored in the daily performance records 211, the statistical performance records 212, and the planning performance records 213.

Figure 3:
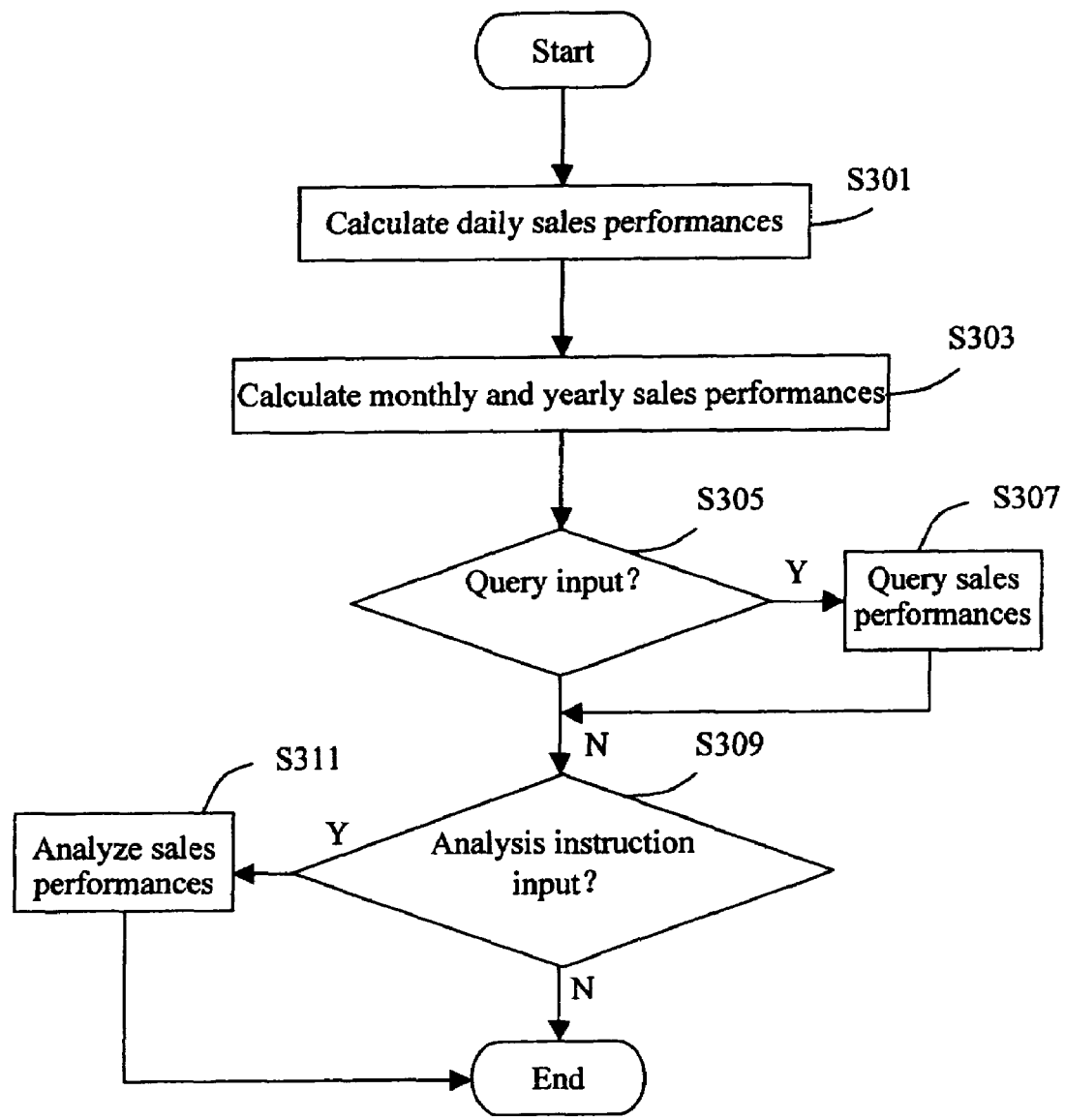
FIG. 3 is a flow chart of calculating and analyzing sales performances in accordance with the present invention.

FIG. 3 is a flow chart of calculating and analyzing sales performances in accordance with the present invention. Firstly, in step S301, the performance calculating module 201 gathers data on sales performances for each day from product sales records, and calculates daily sales performances according to customers, channels of distribution, sales representatives, sales departments, distribution areas, product codes, product quantities and total values of products. The document updating module 205 stores the calculation results in the daily performance record 211. In step S303, on a designated day of every calendar month, the performance calculating module 201 calculates monthly sales performances in accordance with the daily performance records 211, and the document updating module 205 stores the calculation results in a monthly statistical performance record 212. On a designated day every year, the performance calculating module 201 calculates yearly sales performances in accordance with the monthly statistical performance records 212, and the document updating module 205 stores the calculation results in a yearly statistical performance record.

The system for analyzing sales performances has the function of querying sales performances. In step S305, the performance querying module 203 determines whether a query has been input. If no query has been input, the procedure proceeds directly to step S309 described below. If a query has been input, in step S307, the performance querying module 203 queries data stored in the database server 121 via the database connecting module 207 and the database management module 210, and displays the query results in the form of a diagram or a picture for the user.

The system for analyzing sales performances also naturally has the function of analyzing sales performances. In step S309, the performance analyzing module 202 determines whether an analysis instruction has been input. The analysis instruction comprises contrasting planned sales performances with actual sales performances, and calculating sales objective achievement rates of planned sales performances relating to customers, products, sales departments, sales representatives and channels of distribution. The user can thereby easily determine bottlenecks of sales. If no analysis instruction has been input, the procedure is ended. If an analysis instruction has been input, in step S311, the performance analyzing module 202 analyzes sales performances in accordance with the analysis instruction.

Figure 4:
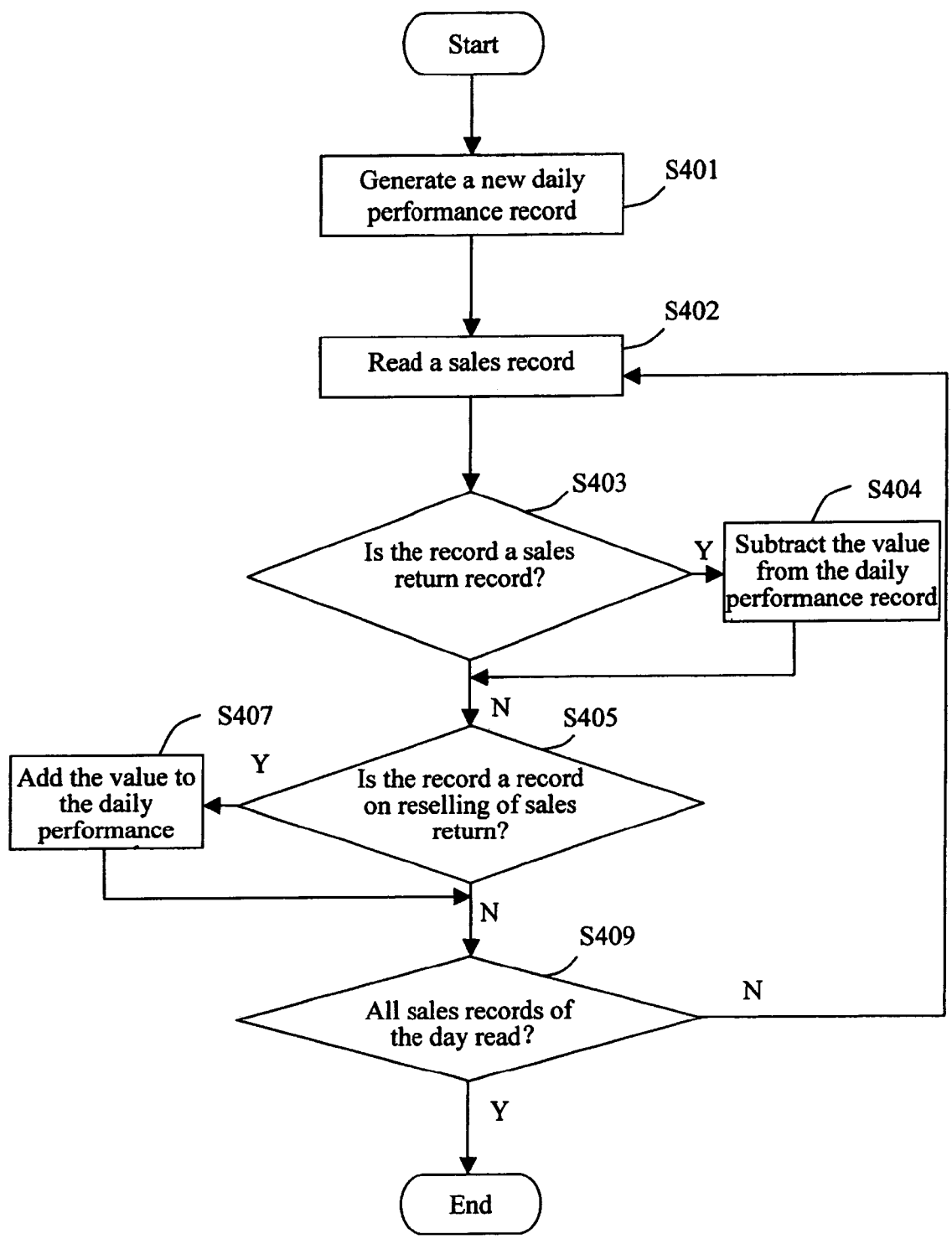
FIG. 4 is a flow chart of details of one step of FIG. 3, namely calculating daily sales performances.

FIG. 4 is a flow chart of details of step S301 of FIG. 3, namely calculating daily sales performances. In step S401, the performance calculating module 201 generates a new daily performance record for storing sales records for a particular day and a total sales value of the same day. In step S402, the performance calculating module 201 reads a sales record of the day from the database server 121. The sales record was input by the user when selling products via the client computers 111, 113, and 115, and comprises data on a type of the sales record and a date of the sales record. The type of the sales record comprises a sales return record and a record on reselling of sales returns.

In step S403, the performance calculating module 201 determines whether the sales record is a sales return record in accordance with the type of the sales record. If the sales record is not a sales return record, the procedure proceeds directly to S405 described below. If the sales record is a sales return record, in step S404, the performance calculating module 201 adds the sales record to the daily performance record 211, and subtracts a value of the sales record from the total sales value. In step S405, the performance calculating module 201 determines whether the sales record is a record on reselling of sales returns in accordance with the type of the sales record. If the sales record is not a record on reselling of sales returns, the procedure proceeds directly to S409. If the sales record is a record on reselling of sales returns, in step S407, the performance calculating module 201 adds the sales record to the daily performance record 211, and adds a value of the sales record to the total sales value of products of the daily performance record 211. In step S409, the performance calculating module 201 determines whether all sales records of the day have been incorporated into the daily performance record 211. If all sales records have been incorporated, the procedure is ended. If not all sales records have been incorporated, the procedure returns to step S402.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A system for analyzing sales performances, the system being comprised in an application server, and comprising a performance calculating module, a performance analyzing module, a performance querying module, and a document updating module, wherein:
    the performance calculating module is configured to calculate daily, monthly, and yearly sales performances in accordance with sales records, the sales records comprising sales return records and records on reselling of the sales returns, wherein the sales return records are reductions and the records on reselling of the sales returns are increases when calculating the sales performances;
    the performance analyzing module is configured to analyze the sales performances relating to customers, products, sales departments, sales representative and channels of distribution in accordance with data stored in daily performance records, statistical performance records and planning performance records;
the performance querying module is configured to query data on sales performances stored in the daily performance records, the statistical performance records and the planning performance records; and
    the document updating module is configured to update data stored in the daily performance records and the statistical performance records; at least one processor of the application server for executing the performance calculating module, the performance analyzing module, the performance querying module, and the document updating module.

2. The system as claimed in claim 1, further comprising a database connecting module which connects the performance calculating module, the performance analyzing module, the performance querying module and the document updating module with the daily performance records, the statistical performance records and the planning performance records for data interchange there between.

3. The system as claimed in claim 1, wherein the daily performance records, the statistical performance records and the planning performance records are comprised in a database server.

4. The system as claimed in claim 3, wherein the database server comprises a database management module for managing data stored in the database server.

5. The system as claimed in claim 1, wherein the performance analyzing module can assist in obtaining implementation statuses of planned sales performances relating to customers, products, sales departments, sales representatives and channels of distribution.

6. The system as claimed in claim 1, wherein the data on sales performances queried by the performance querying module comprises data on customers, channels of distribution, sales representatives, sales departments, and products.

7. A computer-enabled method for analyzing sales performances, the method comprising the steps of:
    calculating daily sales performances in accordance with sales records by subtracting values of the sales records from total values of products of daily performances records if the sales records are sales return record, and adding values of the sales records to the total values of products of the daily performances records if the sales records are records in reselling of sales returns, and storing the daily sales performances in daily performance records of a database server;
    calculating monthly and yearly sales performances in accordance with data stored in the daily performance records, and storing the monthly and yearly sales performances in statistical performance records of the database server;
    querying the statistical performance records in accordance with an instruction input by a user;
    analyzing sales performances relating to customers, products, sales departments, sales representative and channels of distribution in accordance with data stored in the daily performance records, the statistical performance records, and the planning performance records; and
    displaying the query result and the analyzed sales performances in the form of a diagram or a picture for the user;
    wherein the steps of calculating and analyzing are performed on a computer.

8. A computer-enabled method for analyzing sales performances, the method comprising the steps of:
    calculating daily sales performances in accordance with sales records by subtracting values of the sales records from total values of products of daily performances records if the sales records are sales return record, and adding values of the sales records to the total values of products of the daily performances records if the sales records are records in reselling of sales returns, and storing the daily sales performances in the daily performance records of a database server;
    calculating monthly and yearly sales performances in accordance with data stored in the daily performance records of the database server, and storing the monthly and yearly sales performances in statistical performance records of the database server;
    querying the statistical performance records in accordance with an instruction input by a user;
    analyzing sales performances relating to customers, products, sales departments, sales representative and channels of distribution in accordance with data stored in at least one of the daily performance records and the statistical performance records; and
    displaying the query result and the analyzed sales performances in the form of a diagram or a picture for the user;
    wherein the steps of calculating and analyzing are performed on a computer.

* * * * *